US000001898H

United States Statutory Invention Registration [19]

[11] Reg. Number: H1,898

Doughty et al.

[45] Published: Oct. 3, 2000

[54] SIGNALING DATA PROCESSING

[75] Inventors: William D. Doughty, Memphis; Scott D. Hoffpauir, Collierville, both of Tenn.

[73] Assignee: DSC/Celcore, Inc., Plano, Tex.

[21] Appl. No.: 09/026,471

[22] Filed: Feb. 19, 1998

Related U.S. Application Data

[60] Provisional application No. 60/060,107, Sep. 26, 1997, and provisional application No. 60/071,153, Jan. 12, 1998.

[51] Int. Cl.[7] ..... H04Q 7/20

[52] U.S. Cl. ..... 455/466

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletche r | 379/60 |

OTHER PUBLICATIONS

Steve Chen, "Hybrid MicroSystems: The Ultimate Flexibility in Cellular Applications", 1996, p. 1–16, Celcore, Inc., Memphis, Tennessee.

"GlobalHub Mobility Manager—Enables One Number PCS Service Via Motorola PPS Residential Products" p. 1–2, Celcore, Inc., Memphis Tennessee, 1996.

"IS–41 Network Hub—The Mobility Manager for Celcore's GlobalSystem" p. 1–2, Celcore, Inc., Memphis, Tennessee, 1996.

"GlobalHub" p. 1–10, Celcore, Inc., Memphis, Tennessee, 1996.

John Scourias, "Overview of the Global System for Mobile Communications", Mar. 27, 1996, p. 1–16, John Scourias.

Martin A. Iroff & Steve Chen, "A distributed GSM Architecture for Low–Traffic Density Markets", *Mobile Communications International*, Oct. 1996, p. 1–3, IBC Business Publishing, London, England.

Information pamphlet, Feb. 1997, p. 1–7, Version 1.0, Celcore, Inc., Memphis, Tennessee.

"BS–20/BS–21, D900/D1800 Base Transceiver Station", p. 1–2, Geschaftszweig Mobilfunknetze, Munchen, Germany, 1997.

"Unique Solutions to Complex Challenges of Wireless Carriers" p. 1–9, Celcore, Inc., Memphis, Tennessee, 1997.

Michel Mouly and Marie–Bernadette Pautet "The GSM System for Mobile Communications", 1992, pp. 79–122, p. 261–646, Cell & Sys, France.

Lawrence Harte, Stever Prokup, and Richard Levine "Cellular and PCS, The Big Picture", 1997, p. 61–181, McGraw–Hill, United States of America.

George Lamb "GSM made Simple", 1997, p. 3–158, Regal Printing, United States of America.

*Primary Examiner*—Daniel T. Pihulic
*Attorney, Agent, or Firm*—John G. Flaim

[57] ABSTRACT

A system for processing signaling data is provided. The system includes a set of one or more signaling interface module(s), connected in series or in parallel. The interface module(s) is connected to the signaling interface module(s). A switching module is connected to the interface module(s). The switching module receives serial signaling data from the interface module(s) in a first sequence, and outputs the serial signaling data to the interface module(s) in a second sequence. The interface module(s) transmits the serial signaling data to the signaling interface module(s).

24 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SIGNALING DATA PROCESSING

CLAIM OF PRIORITY

The instant patent application claims priority from (a) U.S. provisional patent application Ser. No. 60/060,107, "Cellular Communication System," Anthony G. Fletcher and Scott D. Hoffpauir, inventors, filed Sep. 26, 1997; and (b) U.S. provisional patent application Ser. No. 60/071,153, entitled "System and Method for Controlling Redundant Components," naming Scott D. Hoffpauir, William D. Doughty, and Steve B. Liao as inventors, and which was filed on Jan. 12, 1998.

RELATED PATENT APPLICATIONS

The instant patent application is related to the following patent application Ser. No. 09/025,870: "Integrated Telecommunications Switch," DSC case number 834-00, attorney docket number 24194000.180, naming Scott D. Hoffpauir and Anthony G. Fletcher as inventors, commonly owned and assigned with the present application and which is filed contemporaneously with this application.

FIELD OF THE INVENTION

The present invention relates generally to switching systems for telecommunications, and more particularly to the processing of signaling data in a switching system.

BACKGROUND

Switching systems are used to provide telecommunications services between two or more user interfaces. User interfaces may include telephone handsets, facsimile machines, computers, and other equipment, and may be connected to the switching system by fixed land-based conductors or wireless services. Telecommunications services are provided by establishing a telecommunications channel between two user interfaces, such that encoded analog or digital data may be transmitted between the user interfaces until a state of completion is reached.

Switching system reliability is an important characteristic of switching systems. Loss of the switching system can result in loss of revenues, customer dissatisfaction, and possibly injury or death if the switching system failure prevents emergency services from being summoned or dispatched in a timely manner. To improve switching system reliability, it is common to use redundant components, such that a single component failure will not result in system unavailability.

Nevertheless, known methods for processing signaling data with redundant components may result in the inefficient use of equipment. In a system that utilizes signaling data interfaces, it may be necessary to have two dedicated signaling interfaces for each external data transmission link that is coupled to the system in order to provide an acceptable level of reliability. If the number of signaling interfaces is decreased by connecting two or more external data transmission links to a single signaling interface, then it may be necessary to change the physical connections to most or all of the signaling interfaces whenever a minor change in system architecture occurs, such as when a data transmission link is added, deleted, or modified.

SUMMARY OF THE INVENTION

Therefore, a need has arisen for a system and method for processing signaling data that does not require a dedicated signaling interface to be used for each data transmission link, and which does not require changes to physical connections to signaling interfaces when a data transmission link is modified.

In accordance with the present invention, a system and method for processing signaling data are provided that substantially eliminate or reduce disadvantages and problems associated with previously developed systems and methods for processing signaling data.

One aspect of the present invention is a system for processing signaling data. The system includes one or more signaling interface modules, connected in series or in parallel. The interface module(s) is connected to one or more signaling interface modules. A switching module is connected to the interface module(s). The switching module receives serial signaling data from the interface module(s) in a first sequence, and outputs the serial signaling data to the interface module(s) in a second sequence. The interface module(s) transmits the serial signaling data to the signaling interface module(s).

Another aspect of the present invention is a method for processing signaling data. The method includes receiving incoming signaling data from one or more transmission links that includes multiple frames. The multiple frames are switched to form one or more incoming signaling data streams. The incoming signaling data stream(s) is processed to form one or more outgoing signaling data streams based on the destinations associated with the multiple frames. The outgoing data stream(s) is switched for transmission over the transmission link(s).

Yet another aspect of the present invention is a method for processing signaling data. The method includes receiving incoming signaling data that includes multiple frames from one or more transmission links. The multiple frames are switched to form one or more incoming signaling data streams. The incoming signaling data stream(s) are processed to form one or more outgoing signaling data streams based on the destinations associated with the multiple frames. The outgoing data stream(s) is switched for transmission over the data channels to one or more signaling interface module. The signaling data stream(s) are transmitted to one or more other signaling interface modules if the signaling interface module(s) become unavailable.

The present invention provides many important technical advantages. One important technical advantage of the present invention is a system for processing signaling data that allows incoming signaling data frames to be switched into a controllable sequence and transmitted to one or more signaling interfaces. The system for processing signaling data of the present invention thus allows multiple channels of signaling data to be transmitted to a single signaling interface without requiring changes to physical connections to the signaling interfaces when system architecture changes are made.

Another important technical advantage of the present invention is a method for processing signaling data that allows multiple frames of signaling data to be easily switched to redundant signaling interfaces. The method of the present invention thus provides for system redundancy without significantly increasing the number of system components.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE DRAWINGS

Figure 1:
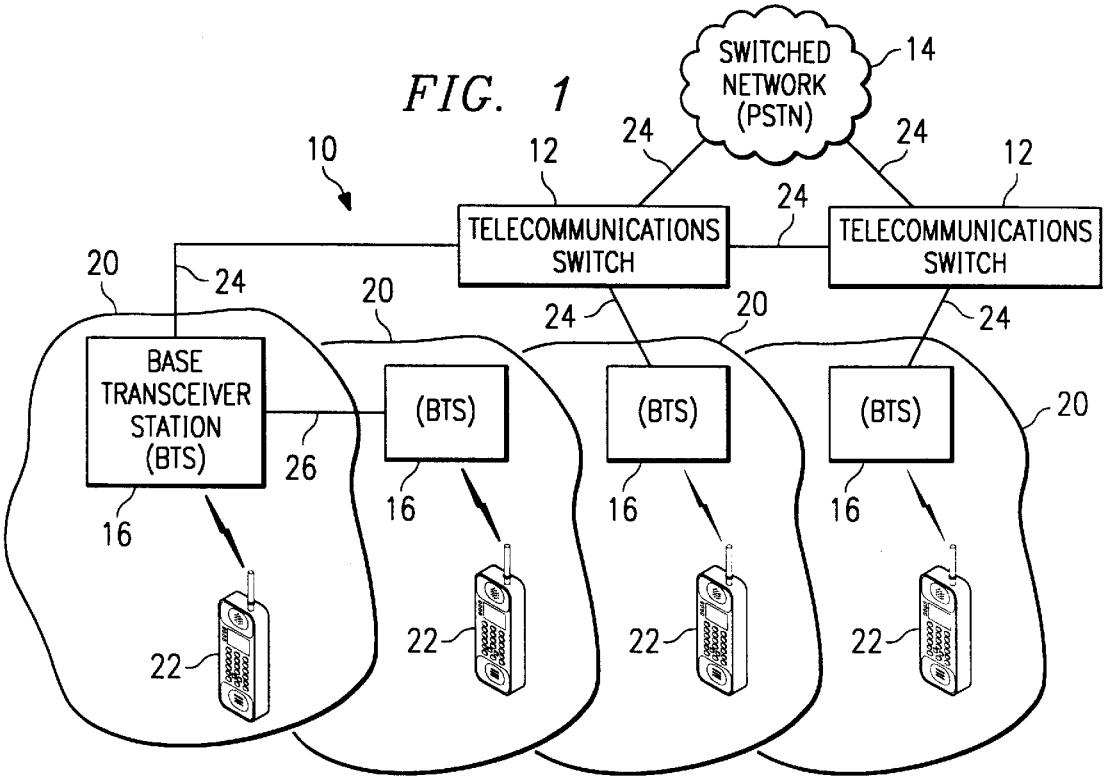
FIG. 1 is a block diagram of a telecommunications network in accordance with an embodiment of the present invention.

FIG. 1 is a block diagram of a telecommunications network 10 in accordance with one embodiment of the present invention. The telecommunications network 10 is a general telecommunications system that may be used to provide telecommunications services to users, without requiring the users to access land based telecommunications interfaces, such as telephone handsets. Telecommunications network 10 may be a Public Land Mobile Network (PLMN).

The telecommunications network 10 includes one or more telecommunications switches 12. The telecommunications switch 12 is a self-contained telecommunications system, and may be coupled to other telecommunications switches 12. The telecommunications switch 12 is typically coupled to a switched network 14, such as the public switched telephone network.

The telecommunications switch 12 may be coupled to one or more base transceiver stations 16, and may be configured to control the operation of any base transceiver stations 16 that are coupled directly to the telecommunications switch 12. The base transceiver station 16 is used to control wireless telecommunications traffic in a service area or cell 20. Subscriber units 22 are used in conjunction with the base transceiver stations 16 and the telecommunications switches 12 to communicate with other subscriber units 22 or with the switched network 14.

The telecommunications switch 12 may be coupled to other telecommunications switches 12, the switched network 14, and to base transceiver stations 16 by a suitable transmission link 24, such as an E1 telecommunications line. Similarly, a base transceiver station 16 may be coupled to another base transceiver station 16 by a suitable transmission link 26. An E1 telecommunications line carries 2.048 megabits of data per second in a standard data format. This standard data format is organized as 30 digitally-encoded telecommunications channels carrying 64,000 bits per second for voice or data applications. In addition, the standard data format includes a single 64,000 bit per second data channel for signaling data, and a single 64,000 bit per second channel for framing, synchronization, maintenance, and control purposes. The base transceiver stations 16 may also transfer data to the telecommunications switches 12 in a Link Access Protocol on the D Channel (LAP-D) data format.

In operation, a user attempts to establish a telecommunication channel using a subscriber unit 22. The user, located in a cell 20, activates a subscriber unit 22, which transmits a service request to a base transceiver station 16 using radio frequency electromagnetic radiation. This radio frequency electromagnetic radiation includes encoded data in a suitable data transmission format, such as time division multiple access or code division multiple access. The base transceiver station 16 transmits the service request to the telecommunications switch 12. The telecommunications switch 12 then determines the destination of the service request and establishes a telecommunications channel.

For example, if the destination is another subscriber unit 22 that is serviced by the telecommunications switch 12 processing the service request, the telecommunications switch 12 will transmit control and signaling data to the appropriate base transceiver station 16. This control and signaling data will be used to notify the user of the subscriber unit 22 that an incoming call is being attempted. Alternatively, the telecommunications switch 12 may transmit control and signaling data to another telecommunications switch 12, which will then transmit appropriate control and signaling data to a base transceiver station 16 for communication with a subscriber unit 22 that is serviced by that other telecommunications switch 12.

If the user at the subscriber unit 22 transmits a request for service to the switched network 14, the telecommunications switch 12 will transmit appropriate signaling and control data to the switched network 14. In addition, the telecommunications switch 12 will receive signaling and control data from the switched network 14 that indicate whether a telecommunications channel has been successfully established. After the telecommunications channel is established, the telecommunications switch 12 performs operation, administration, maintenance, and provisioning functions to maintain the telecommunications channel until the call is completed. The telecommunications switch 12 then de-allocates the call resources.

Figure 2:
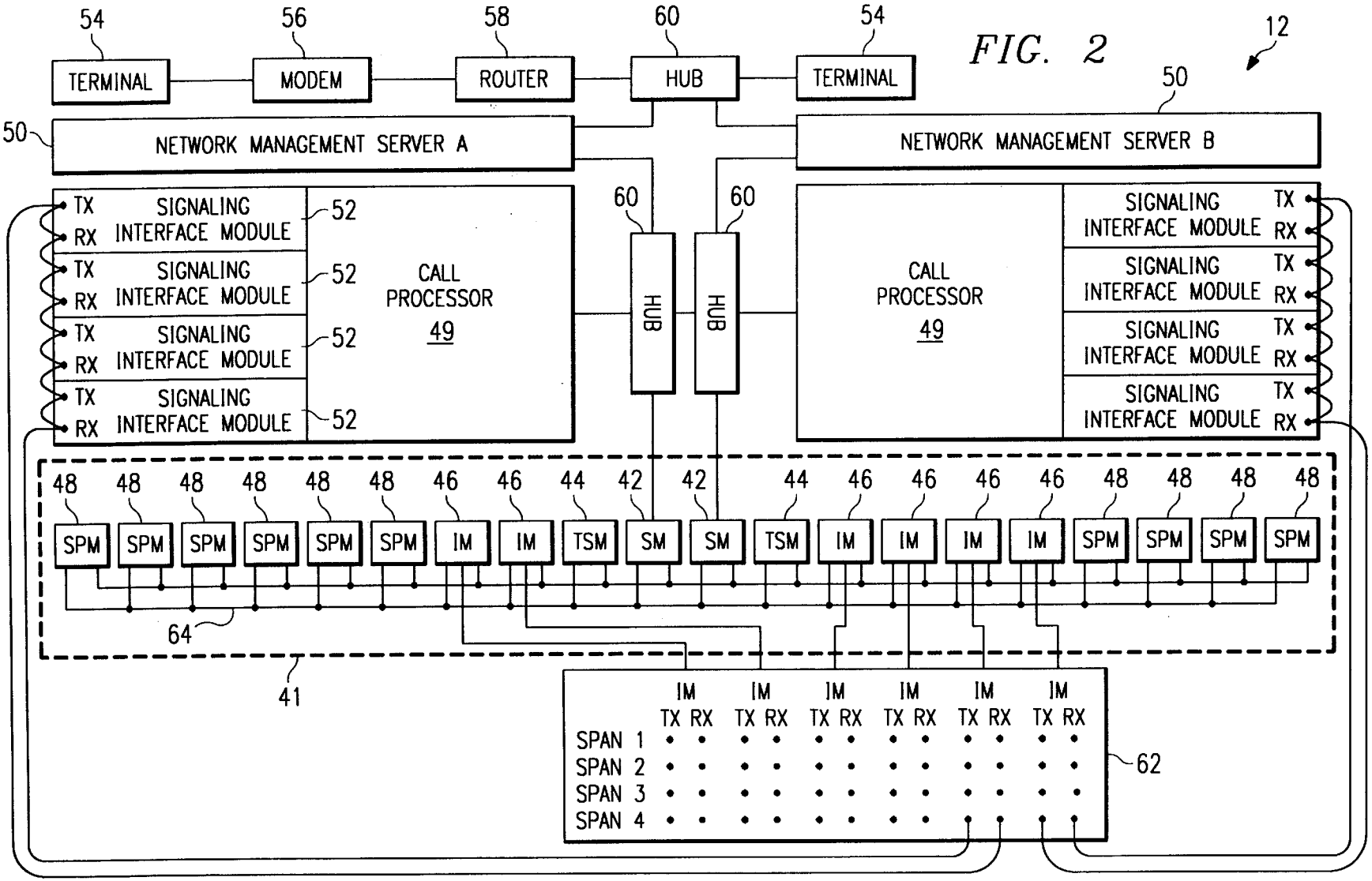
FIG. 2 is a block diagram of a telecommunications switch in accordance with an embodiment of the present invention.

FIG. 2 is a block diagram of a telecommunications switch 12. The telecommunications switch 12 includes multiple resource modules 41 that provide the other elements and components of the telecommunications switch 12 with suitable resources such as switching, rate adaption, transcoding.

The telecommunications switch 12 preferably includes one or more switching modules 42. The switching module 42 may be implemented in software, hardware, or a suitable combination of software and hardware. For example, the switching module 42 may comprise suitable digital data processing devices, such as a switching matrix, a processor (for example a Motorola 68360 telecommunications processor), random access memory, and other devices. The switching module 42 runs a suitable operating system such as pSOS+.

The switching module 42 may also include one or more pulse code modulation bus interfaces, one or more control bus interfaces such as High Level Data Link Controller (HDLC) control bus interfaces, one or more Ethernet interfaces, and an arbitration bus interface to other switching modules 42. The switching module 42 is coupled to a suitable data link 64, such as one or more control buses such as High Level Data Link Control buses and one or more pulse code modulation buses.

The switching module 42 performs switching operations, clock operations, and local communications between the resource assembly components (the switching modules 42, the telephony support modules 44, the interface modules 46, and the signal processing modules 48) of the telecommunications switch 12 (as illustrated in FIG. 2). These functions may be performed using pulse code modulation switching and data transfer techniques, Link Access Protocol on the D Channel communications, and Ethernet interface communications.

The telecommunications switch 12 also preferably includes one or more telephony support modules 44. The telephony support module 44 may be implemented in software, hardware, or a suitable combination of software and hardware. For example, the telephony support module 44 may comprise suitable telecommunications data processing equipment, such as a processor (for example, an Intel 80186 processor), random access memory, one or more redundant High Level Data Link Controller bus interfaces, one or more pulse code modulation buses, and an arbitration bus for establishing active telephony support module 44 status. The telephony support module 44 is coupled to a suitable data link 64, such as one or more High Level Data Link Control buses and one or more pulse code modulation buses.

The telephony support module 44 may be used to provide tone generation, R2 digit transceiver functions, and digitized announcement generation for telecommunications switch 12. The telephony support module 44 may also provide call setup functions, such as digit collection and out-pulsing, and call completion functions, such as digitized announcement generation and call supervisory tone generation. A single telephony support module 44 provides the required functionality for the telecommunications switch 12. One or more additional telephony support modules 44 are used to provide redundancy in the event of component failure.

The telecommunications switch 12 also preferably includes one or more interface modules 46. The interface module 46 is an interface device that is used to interface a suitable number of telecommunications lines that carry data in a predetermined format, such as an E1 data format, with the telecommunications switch 12. The interface module 46 may be implemented in software, hardware, or a suitable combination of software and hardware. For example, the interface module 46 may comprise suitable data processing equipment, such as a processor (for example an Intel 80186 processor), random access memory, up to four E1 ports, redundant High Level Data Link Controller bus interfaces, and pulse code modulation bus interfaces.

The interface modules 46 provide the physical interface between the telecommunications switch 12 and other switches 40, the switched network 14, and the base transceiver stations 16 as shown in FIG. 1. The interface modules 46 also support in-band trunk signaling for data channels that are configured for channel associated signaling, and transmit data to and receive data from the signaling interface modules 52.

The interface module 46 is coupled to a suitable data link 64, such as one or more High Level Data Link Control buses and one or more pulse code modulation buses. The interface module 46 is also coupled to an interface module interface 62, which is used to connect the interface module 46 to external data links such as one or more transmission links 24. Each external data link typically includes a transmit lead and a receive lead.

The telecommunications switch 12 also preferably includes one or more signal processing modules 48. The signal processing module 48 may be implemented in software, hardware, or a suitable combination of software and hardware. For example, the signal processing module 48 may comprise suitable data processing equipment, such as a processor (for example an Intel 80186 processor), random access memory, one or more Super Harvard Architecture Computer (SHARC) digital signal processor circuits, four daughter board module ports, redundant High Level Data Link Controller buses, pulse code modulation matrix bus interfaces, and other signal processing application hardware.

The signal processing module 48 may be used to perform transcoding and rate adaption (TRAU) functions, such as converting from a wireless system speech encoding format to a pulse code modulation data format. For example, the telecommunications switch 12 may be used to provide switching services in a wireless telecommunications system that uses Groupe Speciale Mobile (GSM) format data. Signal processing module converts data from the GSM data format to an appropriate format, such as the pulse code modulation data format. Digital signal processor daughterboards may be used to allow the capacity of calls handled by the signal processing module 48 to be increased or decreased, as appropriate to support system requirements.

The telephony support modules 44, the interface modules 46, and the signal processing modules 48 are preferably coupled through switching modules 42 and hub switches 60 to redundant call processor systems 49. The call processor system 49 is operable to control the function of components of the telecommunications switch 12.

The call processor system 49 is a general purpose computing platform, such as a Pentium II based computing platform, that includes suitable hardware and software systems to support telecommunications processing. The call processor system 49 may use a real-time operating system such as QNX™ to support the real-time call processing requirements of switch 12.

The call processor 49 preferably includes one or more systems that allow it to perform the functions of a base station controller system and a message switching center system. In addition, the call processor 49 provides other elements that take part in processing calls directed to, or initiated by, the subscriber units 22. Specifically, the call processor 49 includes a call processing application that provides various call processing and signaling functions, such as call origination and termination functions, as well as location updating and handover of mobile subscribers.

For example, the call processing application may provide GSM call processing functions and include a visitor location register system, a home location register system, a mobile application part system, a base station subscriber system, a mobile switching center system, an SS7 signaling system, and other suitable systems. An example of a GSM call processing application that may be used to provide the functionality of call processor 49 is provided by patent application Ser. No. 09/025,870, "Integrated Telecommunications Switch," DSC case number 834-00, attorney docket number 24194000.180, naming Scott D. Hoffpauir and Anthony G. Fletcher as inventors, commonly owned and assigned with the present application, filed contemporaneously with this application, and which is hereby incorporated by reference for all purposes.

The call processor 49 is coupled to a primary and a secondary network management server 50. The primary and secondary network management servers 50 are redundant network management systems servers that provide operation, administration, maintenance, and other functions for the components of the telecommunications switch 12. The network management servers 50 incorporate the functionality of both an Operations Maintenance Center - Radio (OMC-R) and an Operations Maintenance Center - Switching (OMC-S).

The signaling interface modules 52 are coupled to the call processors 49 and the interface modules 46. The signaling interface modules 52 are used to provide an interface between the call processors 49 and a signaling system, such as one that transmits data in a signaling system seven (SS7)

data format. For example, data in an SS7 data format may be received from a transmission link 24 from the public switched telecommunications network 14 or other switches 40, and may be switched to a transmission link 26, such as an E1 telecommunications channel, from interface modules 46 to signaling interface modules 52 by switching modules 42.

The terminals 54 are coupled to the primary and secondary network management servers 50 either directly or through a modem 56, a router 58, and hub switch 60. The terminals 54 are used to interface with the primary and secondary network management servers 50. The terminals 54 and the primary and secondary network management servers 50 comprise a network management system that allows a user to remotely monitor and manage telecommunications switch 12.

In operation, a user of a wireless telecommunications system attempts to place a call using a telecommunications switch 12. Signaling data and other call control data is received from a base transceiver station in an E1 data format at an interface module 46. This data is then switched through a switching module 42 to a telephony support module 44, which performs call setup functions. A call processor system 49 receives the signaling data, and determines the call destination.

Depending upon the call destination, the call processor system 49 sends signaling and call control data to the switched network 14, another telecommunications switch 12, or a base transceiver station 16 serviced by the telecommunications switch 12 containing the call processor system 49. If a telecommunications channel can not be established, a busy signal, no answer message, or other appropriate response is generated by a telephony support module 44, and the call attempt is terminated.

If a telecommunications channel can be established, the call processor system 49 configures the switching module 42, the telephony support module 44, the interface modules 46, and the signal processing modules 48 to process the call data. A similar process is also used to handle incoming telecommunications channels from other switches 40 or the switched network 14, or to de-allocate telecommunications switch 12 components after the call is completed.

Figure 3:
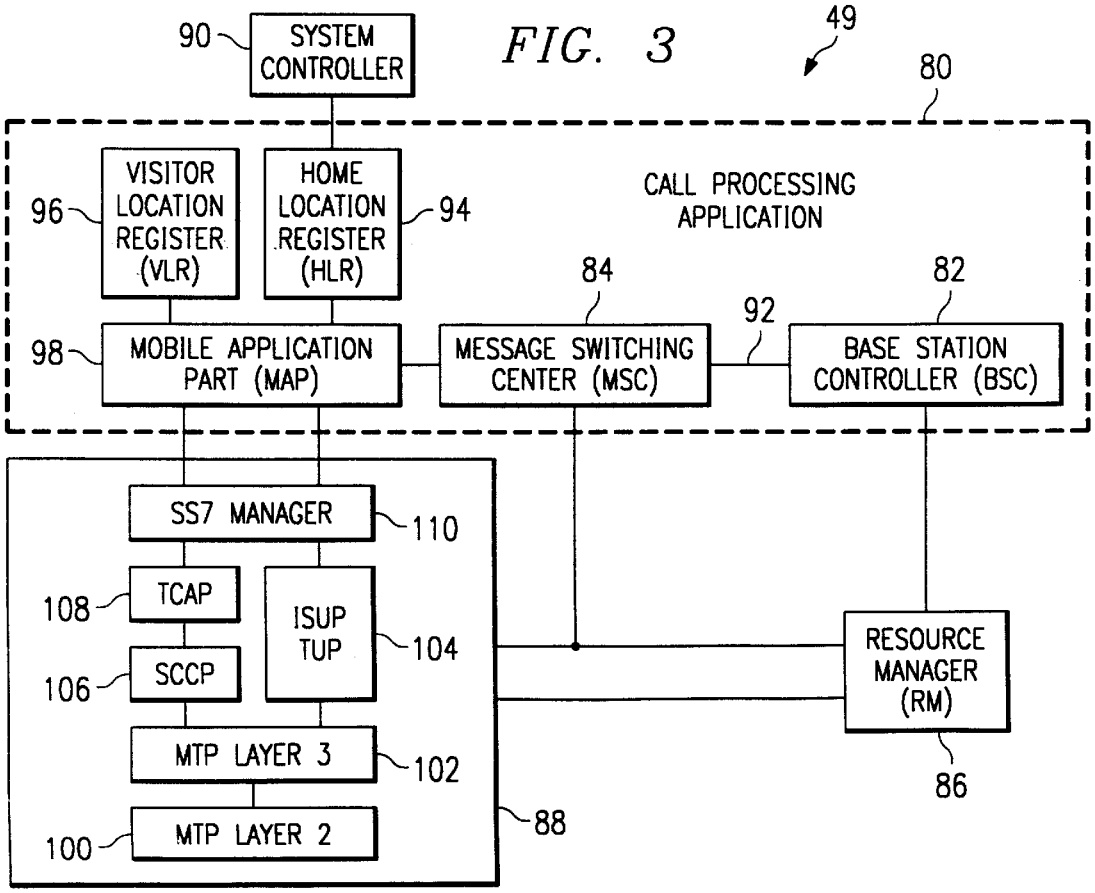
FIG. 3 more specifically illustrates certain elements and resources associated with the telecommunication switch, in accordance with an embodiment of the present invention.

FIG. 3 more specifically illustrates certain elements and resources associated with the telecommunication switch 12, in accordance with an embodiment of the present invention.

The call processor 49 preferably includes a call processing application 80 that includes, among other things, a base station controller 82 and a message switching center 84. In addition, the call processor 49 preferably includes several other elements, namely, a resource manager 86, an SS7 element 88 and a system controller 90.

The base station controller 82 is responsible for management of the radio interface associated with each base transceiver station 16, including the allocation and release of radio channels associated with a given radio interface, and management of handovers from one base transceiver station 16 to another base transceiver station 16. The base station controller 82 manages the radio transmission equipment associated with the base transceiver station(s) 16 and is responsible for management of the radio interfaces through the allocation, release, and handover of radio transmission channels.

The base station controller 82 interfaces with the resource assembly 66 for management of the traffic channels and transcoders as well as for access to the telecommunication switch 12. The base station controller 82 interfaces with the network management server 50 for fault, configuration, and performance management of both the base station controller 82 and the base transceiver station(s) 16.

The base station controller 82 carries out various procedures that relate to call connection tasks. Some of those procedures include: system information broadcasting; subscriber paging; immediate traffic channel assignment; subsequent traffic channel assignment; call handover; radio connection and release; connection failure detection and reporting; and power capability indication reporting.

The message switching center 84 is primarily responsible for mobility management, call control and trunking, such as coordinating the setting-up and termination of calls to and from subscriber units 22. Additionally, it provides all of the functionality needed to handle mobile subscribers through location updating, handover, and call delivery.

The message switching center 84 interfaces with the resource assembly 66 for, among other things, trunk management, tone generation, digit collection and switching. It interfaces with the network management server 50 for fault management, configuration management, performance management and accounting management.

As discussed more fully below, the base station controller 82 and the message switching center 84 are preferably implemented in software that is associated with one or more processors. Such implementation is preferable since, among other reasons, software is presently more readily modified to reflect desired changes in the base station controller 82 and/or message switching center 84. It is, however, readily appreciable that such elements may be implemented in numerous other ways within the scope of the present invention. For example, the base station controller 82 or the message switching center 84 can be implemented within one or more integrated circuits within the scope of the present invention.

The interface between the base station controller 82 and the message switching center 84 is commonly known as the A interface 92. The A interface 92 provides the link for managing traffic channels/transcoders, and also provides the MSC with access to an Abis interface for message flow with the mobile stations. The BSSMAP protocol is used for transmitting connection-related requests and paging requests between the message switching center 84 and base station controller 82. Preferably, the base station controller 82 and the message switching center 84 are implemented as distinct entities, such as separate software objects that communicate with one another, so that the A interface 92 is logically discernible.

Management and allocation of resources provided by the resource assembly 66 with respect to the call processor 49 is carried out by the resource manager 86. That is, the resource manager 86 acts as the bridge between the call processing application 80 and the resource assembly 66 by enabling different elements of the call processing application 80 to interface with resources of the resource assembly 66. Preferably, the resource manager 86 also provides an interface to the signaling interface modules 52 for the SS7 element 88 as well as remote elements, such as the system controller 90 and various elements of the network management system 50.

The resource manager 86 is preferably implemented in software, and achieves the management and allocation of resources by employing object request broker technology. More specifically, the resource manager 86 provides a proxy object for each element or application outside the resource manager 86 which may seek to interface with the resource manager 86. Similarly, each such object or application is provided with a counterpart proxy object. An interface is defined between each proxy object of the resource manager 86 and the element or application to which it corresponds, as well as between each counterpart proxy object and the resource manager 86.

An interface can be defined using Interface Definition Language or IDL, which establishes acceptable messages and responses that can be exchanged over the defined interface. When a particular element or resource desires to interface with a resource of the resource assembly 66 or the signaling interface modules 52, a message is sent from that element or application to the counterpart proxy object of that element or application. That counterpart proxy object then, in turn, forwards the request to the resource manager 86 in conformance with the defined interface. Similarly, when the resource manager 86 interfaces with a particular element or application (for example, the call processing application 80) with respect to a resource of the resource assembly 66 or the signaling interface modules 52, a message is sent to the proxy object of the resource manager 86 corresponding to the particular element or application. That proxy object then, in turn, forwards the request to the particular element or application in conformance with the defined interface.

The SS7 element 88 provides the logic needed to provide SS7 signaling functionality for SS7 connectivity to the switched network 14. It is responsible for performing various functions and user interfaces associated with the various parts and protocols that are included within SS7 signals. For example, the SS7 element 88 receives SS7 data that has been transmitted to the signaling interface modules 52 from the interface modules 46, and transforms the data as required to support the call processing application 80.

Likewise, the SS7 element 88 receives data from the call processing application 80 and transforms the data as required for transmission in accordance with the SS7 signaling protocol. This transformed data is then provided to the signaling interface modules 52 for transmission to the telecommunication switches 12 and the switched network 14.

The system controller 90 is responsible for ensuring that the call processor 49 is operating properly by periodically testing elements of the call processor 49. A successful test of an element of the call processor 49 may comprise, for example, observing a predetermined response from the element after sending a predetermined message to the element. This is sometimes referred to as "pinging" an element.

The call processing application 88 includes a visitor location register 96 (sometimes abbreviated as VLR), a home location register 94 (sometimes abbreviated as HLR), and a mobile application part 98 (sometimes abbreviated as MAP). Both the HLR 94 and the VLR 96 provide a database function for subscriber related information. Such subscriber related information includes subscription information for such subscribers, such as the service options to be provided to each subscriber (for example, voice mail, call waiting, etc.), preferences and option selections supplied by the subscribers (for example, voice mail prompts), and the location of those subscribers. The HLR 94 provides that database function for certain set of subscribers, namely, those subscribers enrolled for service with the operator of the telecommunications switch 49 or otherwise associated with the telecommunications switch 49. In contrast, the VLR 96 provides a database function for those subscribers known to be situated in the area serviced by the telecommunications switch 49 and its associated base transceiver station(s) 116. Those subscribers would therefore include roaming subscribers, i.e., subscribers associated with another operator or telecommunications switch for which subscriber related information is maintained externally but not in the HLR 94 of the telecommunications switch 49. To obtain subscriber related information about a roaming subscriber, the VLR 502 of a telecommunications switch 49 would therefore have to access the HLR of another operator or telecommunications switch. Such access would, in turn, provide that external HLR with knowledge of the location of he roaming subscriber.

It should be appreciated that although conventional systems typically integrates functions associated with the MSC 84 and the VLR 96, it is preferable to form distinct elements for those functions.

SS7 signaling is provided to the telecommunications switch 49 as a transport mechanism for MAP dialogues and out-of-band signaling with other switches. That signaling includes several parts, each having a distinct protocol. Specifically, SS7 signals include: (a) a lower layer Message Transfer Part (sometimes abbreviated as MTP), which applies to call related or non-call related signaling; (b) a Signaling Connection Control Part (sometimes abbreviated as SCCP) and a Transaction Capabilities Application Part (sometimes abbreviated as TCAP), which apply only to GSM signaling and (c) telephone user part and ISDN user part, which apply only to PSTN call related signaling.

The SS7 component 88 includes an element that corresponds with the aforementioned parts, namely, a MTP Layer 2 element 100, a MTP Layer 3 element 102, and ISUP/TUP element 104, an SCCP element 106 and a TCAP element 108. Through these elements, the SS7 component 88 provides functionality related to each of those elements 100–108, including ISUP roaming, Global Title translations, and terrestrial and satellite links.

The SS7 manager element 110 provides for management and cooperation with respect to the other elements of the SS7 component and other elements of the call processor assembly 49, such as the resource manager 86, the MAP 98 and the MSC 84.

The MAP element 98 is the logical link between the VLR 96 and HLR 94. As such, it is directly associated with the VLR 96 and the HLR 94 and provides the dialogues through which they communications with each other and with other elements. The MAP 98 provides a protocol based on the services provided by the SS7 element 88 for GSM call related signaling (specifically, TCAP) for use by other elements. The specific nature of the protocol provided by the MAP 98 is dependent on the identity of such elements, which is sometimes referred to as the MAP protocol interface. For example, messages between the VLR 96 and an external HLR utilize one MAP protocol interface while messages between the HLR 94 and an external VLR utilize another MAP protocol interface. Preferably, an authentication element is integrated within the HLR 94 to provide authentication information to the HLR 94 for validating subscribers requesting service from the telecommunication system 12.

In operation, signaling data is received from other telecommunications switches 12 and the switched network 14 at interface modules 46 via transmission links 26. The signaling data may be transmitted over a dedicated signaling data transmission link, or may alternatively be transmitted in predetermined locations over a general data transmission link in addition to payload data, such as telecommunications channels for voice or data communications. Such nondedicated signaling data may be encoded into predetermined data frames in a suitable data transmission protocol, such as an E1 protocol, or may also or alternatively be encoded into predetermined bytes or bits of data within a data frame.

After the signaling data is received at the interface modules 46, it is transferred to the switching module 42 in accordance with control data received from the call processor 49. The switching module 42 changes the sequence of the signaling data in response to the control data received from the call processor 49. For example, the switching module may receive frames of signaling data in the sequence "frame 1 - frame 2 - frame 3" from the interface modules 46, and may change the sequence of the signaling data to "frame 2 - frame 1 - frame 3," or another suitable sequence.

After the signaling data has been switched by the switching module 42, it is transferred to an interface module 46 for transmission to the signaling interface modules 52. Each signaling interface module may controllably receive signaling data from and transfer signaling data to the transmission link 26 that couples the interface module 46 to the signaling interface module 52. Thus, if three signaling interface modules 52 are utilized, the first signaling interface module may receive incoming signaling data in the sequence "frame 2 - frame 1 - frame 3" from the interface module 46, may extract the "frame 3" data from the sequence, and may encode new outbound signaling data into the "frame 3" location of the sequence.

In this example, the signaling interface module 52 would transfer the incoming signaling data to the call processor 49. The signaling interface module 52 would also receive the outbound signaling data from the SS7 element 88. The outbound signaling data may then be switched by the switching module 42 for transmission over external transmission links 26.

In this manner, signaling data from two or more external transmission links 26 may be concentrated by the switching module 42 into dedicated signaling channels for transmission to signaling interface modules 52, and may be received from all of the signaling interface modules 52 for transmission over the two or more external transmission links 26. Thus, it is not necessary to couple each external transmission link 26 to a signaling interface module 52 in order to transfer incoming signaling data to call processor 49 or to transfer outbound signaling data from call processor 49 to external transmission links 26.

Figure 4A:
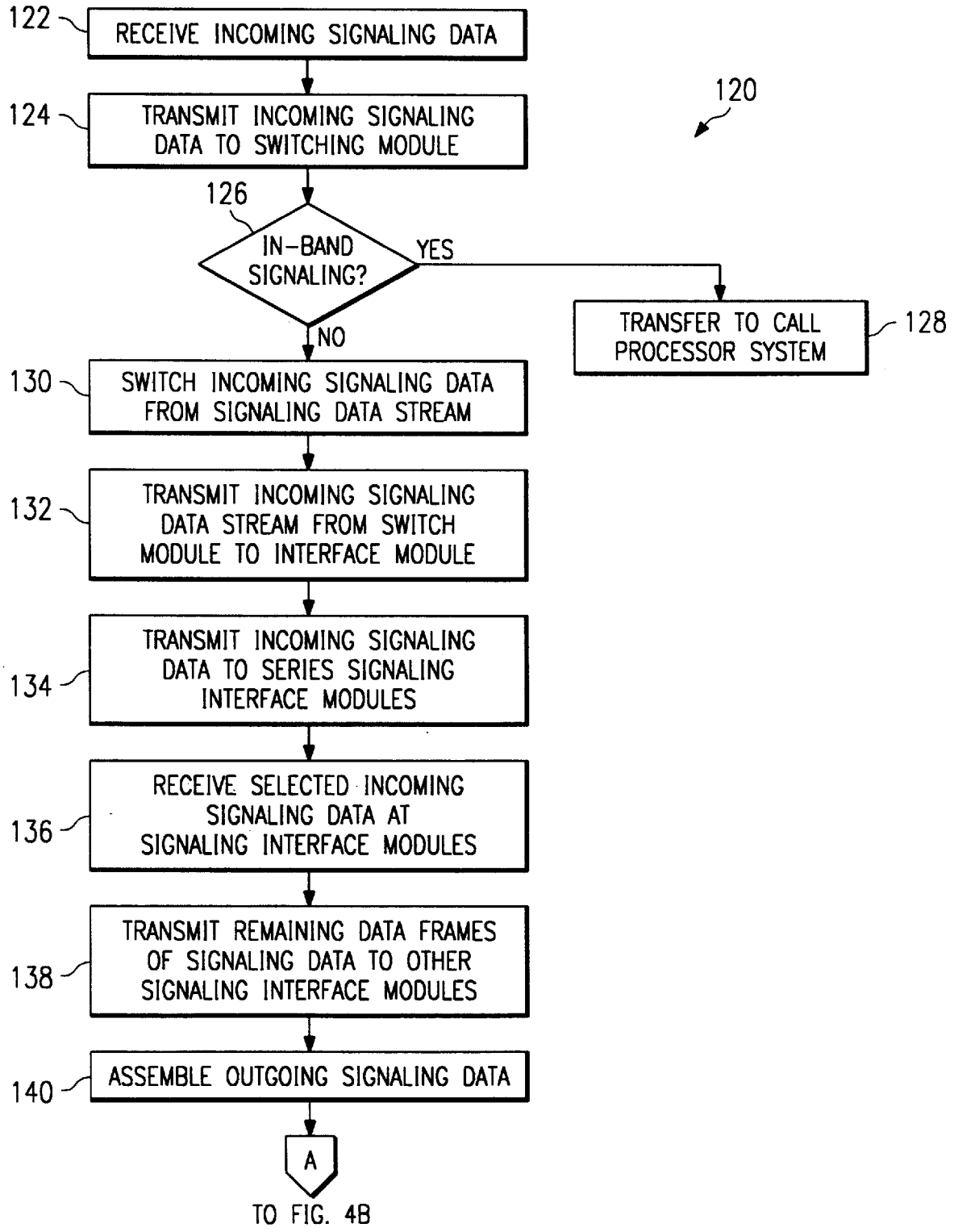
FIGS. 4A and 4B are a flow chart of a method for processing signaling data in accordance with one embodiment of the present invention.
Figure 4B:
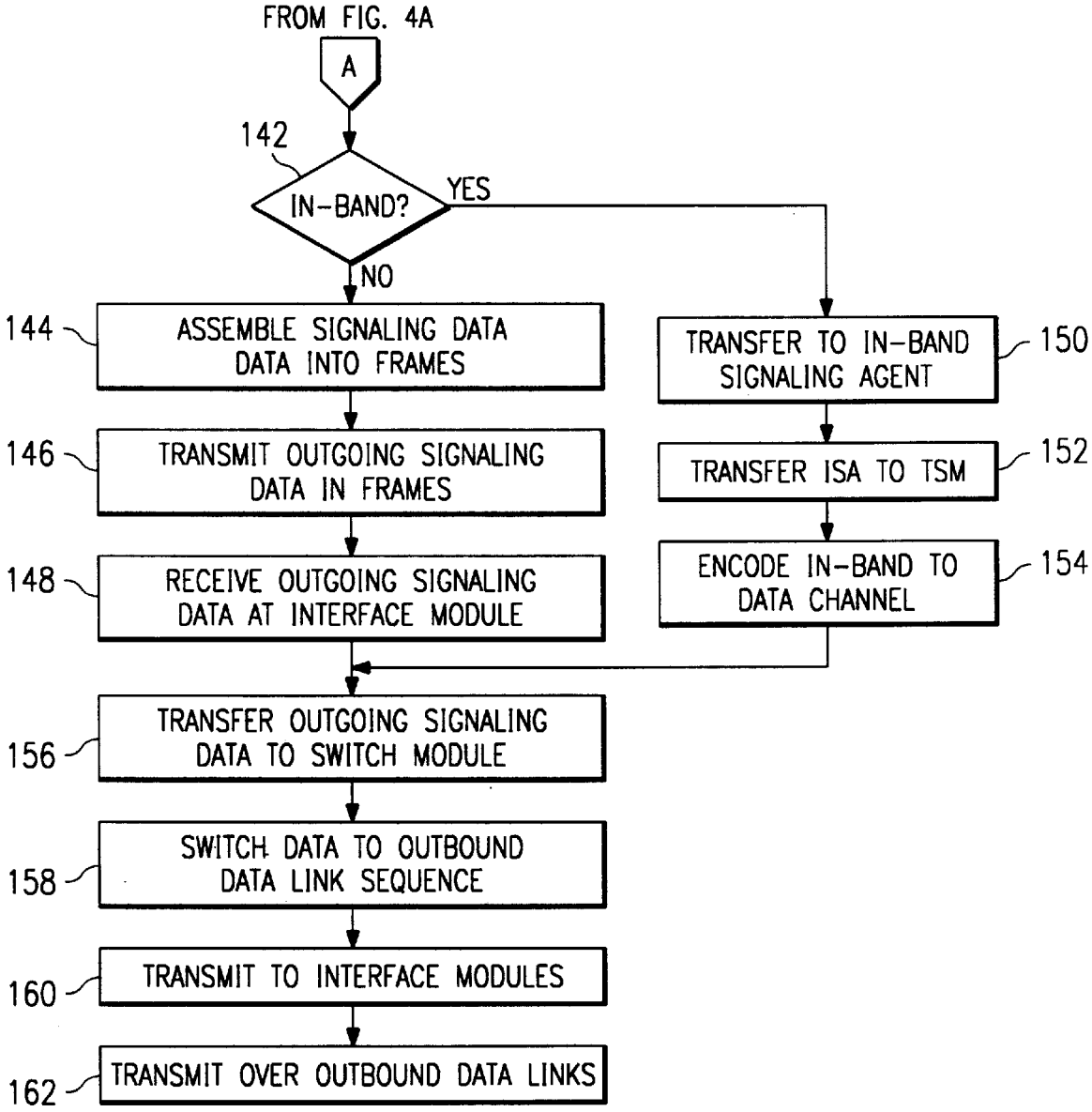

FIGS. 4A and 4B are a flow chart of a method 120 for processing signaling data in accordance with one embodiment of the present invention. Method 120 begins at step 122, where incoming signaling data is received at a telecommunications switch. For example, the incoming signaling data may be received at an interface module in an E1, R2, or LAP-D standard data format. The method then proceeds to step 124.

At step 124, the incoming signaling data is transmitted to a switching module, such as a time slot interchange switch. At step 126, it is determined whether in-band signaling is being used, such as in an R2 or LAP-D standard data format. If in-band signaling is being used, the method proceeds to step 128, where the signaling data is transmitted to a call processor application with the in-band data. Otherwise, the method proceeds to step 130.

At step 130, the incoming signaling data is switched to form an incoming signaling data stream. For example, the incoming signaling data may be received over two or more telecommunications links in an E1 standard data format, which includes frames of payload data and frames of signaling data. The signaling data from these two or more telecommunications links may be extracted from the E1 standard format, and combined into a continuous sequence of signaling data at step 130.

At step 132, the incoming signaling data stream is transmitted from the switch module to the interface module. The method then proceeds to step 134, where the incoming signaling data stream is transmitted from the interface module to one or more signaling interface modules. If more than one signaling interface module is used, the signaling interface modules are preferably coupled in series, but may also or alternatively be coupled in parallel.

At step 136, the incoming signaling data stream is received at the first signaling interface module, and selected incoming signaling data is extracted from the incoming signaling data stream. For example, the incoming signaling data stream may include 24 frames of signaling data, in which each frame of signaling data comprises one channel of signaling data. The first signaling interface module may controllably extract predetermined frames, such as frames 1, 13, and 17, from the incoming signaling data stream. The method then proceeds to step 138.

At step 138, the incoming signaling data stream is preferably transmitted to other signaling interface modules, although this step may be omitted if only one signaling interface module is used, or if the signaling interface modules are coupled in parallel. The method then proceeds to step 140, where outbound signaling data is assembled.

At step 142, it is determined whether in-band signaling is to be utilized for the outbound signaling data. For example, predetermined telecommunications trunks may utilize in-band signaling such as in an R2 standard data format, while other telecommunications trunks may utilize out-of-band signaling, such as in an E1 standard data format. The method of the present invention allows both in-band and out-of-band signaling to be utilized.

If in-band signaling is not utilized for the outbound signaling data, the method proceeds to step 144, where signaling data is assembled into frames having a predetermined format. For example, a call processor application may receive and process signaling data from a plurality of subscriber units that require access to a switched network or other telecommunications switches. The signaling data from these subscriber units is processed by the call processor and assembled into frames.

At step 146, the outbound signaling data is transmitted in frames from the signaling interface module. For example, as previously described, one or more signaling interface modules may be used to transmit signaling data over a signaling data channel to a switching circuit. A first signaling interface module may encode signaling data frames into predetermined slots on the signaling data channel, such as frames 4, 7, and 13. Other signaling interface modules may also encode outbound signaling data frames in series or in parallel. At step 148, the outbound signaling data is received at an interface module. The method then proceeds to step 156.

If in-band signaling is being used for the trunk associated with the outbound signaling data, the method proceeds to step 150 from step 142. At step 150, the outbound signaling data is transferred by the call processor to a suitable system for processing in-band signaling data, such as an in-band signaling agent. The in-band signaling agent is transferred to a [TSM? what is this?] at step 152, and the method proceeds to step 154. At step 154, the in-band signaling is encoded into the data channel by the call processor. The method then proceeds to step 156.

At step 156, the outbound signaling data is received either from the signaling interface modules, if it is out-of-band signaling, or from the call processor with the payload data, if it is in-band signaling. The method then proceeds to step 158, where the outbound signaling data is switched to the outbound data link sequence. For example, if the outbound data link carries data in an E1 standard data format, the outbound signaling data is switched in frames to the appropriate frame slots in the data transmission links. Likewise, if the outbound data link carries data in an R2 standard data format, the outbound signaling data is transferred in-band with the payload data over the data transmission link.

At step 160, the outbound signaling data is transmitted with the payload data in a suitable data format to the interface modules. The outbound data is then transmitted to the outbound data links at step 162.

In operation, inbound signaling data is received at a telecommunications switch in an in-band or out-of-band format over one or more data transmission links. The inbound signaling data is then transmitted to a call processor with the payload data, if the inbound signaling data is in-band, or to a signaling interface module, if the in-bound signaling data is out-of-band. The inbound signaling data is then processed as appropriate by the call processor.

The call processor also compiles outbound signaling data for transmission over the data transmission links. If the outbound signaling data is to be transmitted in an out-of-band signaling format, the outbound signaling data is assembled into frames and is transferred to a signaling interface module, then to an interface module and to a switching module. otherwise, the outbound signaling data is transferred to the switching module from the call processor in-band with the payload data. At the switching module, the outbound signaling data is switched and transmitted to an appropriate data transmission link.

The present invention thus allows signaling data to be received at a telecommunications switch from one or more data transmission links in either an in-band or out-of-band format. One or more signaling interface modules may be controllably coupled to any of the data transmission links through the switching modules, instead of requiring a dedicated signaling interface module to be used for each data transmission link. In addition, outbound signaling data may be transferred to any of the data transmission links that are coupled to the switching modules through the interface modules, in either an in-band or out-of-band signaling format.

Figure 5:
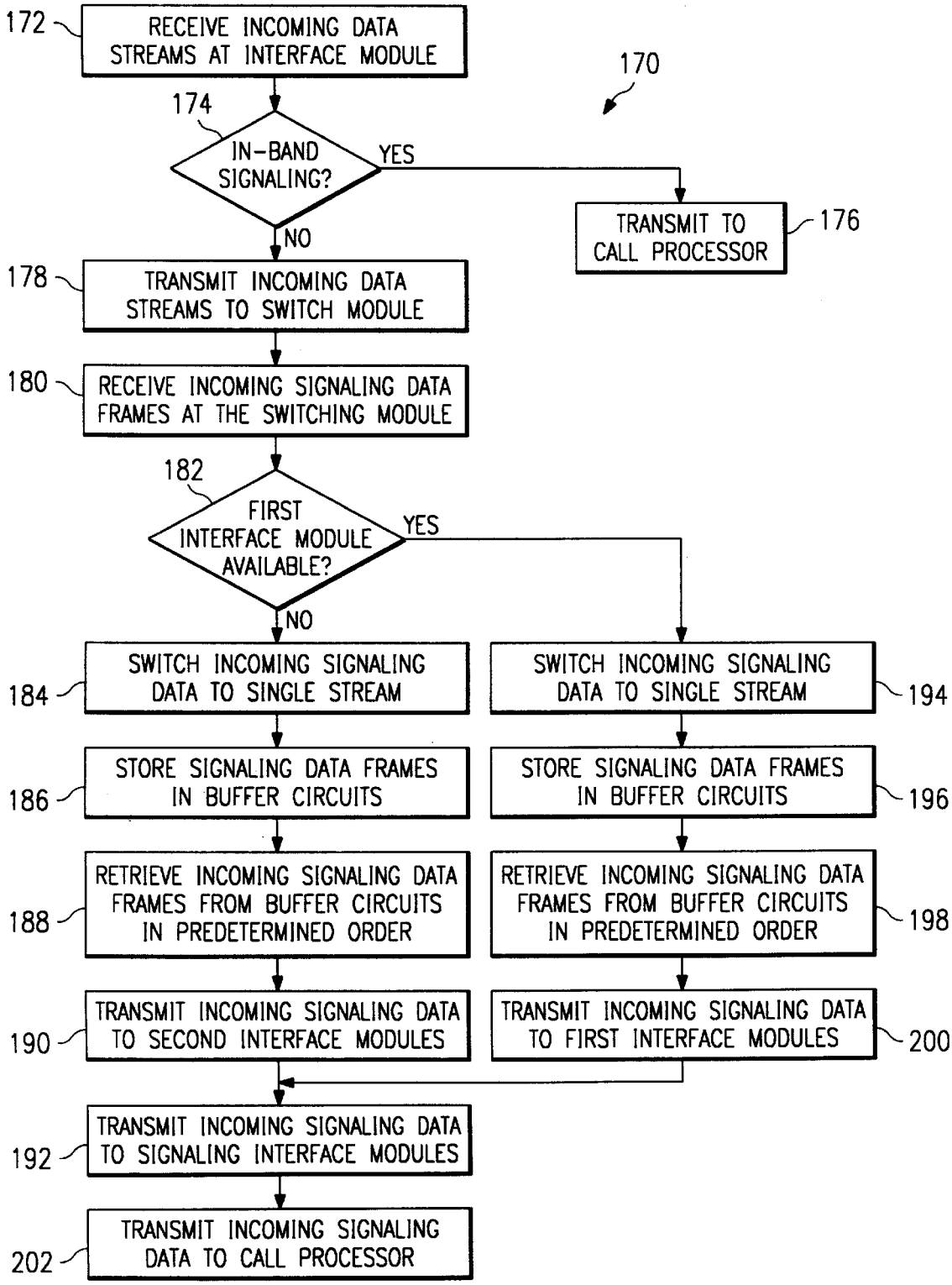
FIG. 5 is a flow chart of a method for receiving signaling data in accordance with one embodiment of the present invention.

FIG. 5 is a flow chart of a method 170 for receiving signaling data in accordance with one embodiment of the present invention. Method 170 begins at step 172, where incoming data streams are received at an interface module. The method then proceeds to step 174, where it is determined whether the incoming data contains signaling in an in-band signaling data format, such as an R2 or LAP-D standard data format. If the incoming data contains in-band signaling data, the method proceeds to step 176, where the incoming data is transmitted to a call processor.

If the incoming data contains out-of-band signaling data, the method proceeds to step 178, where the incoming data stream is transmitted to a switching module. The incoming data stream is received at the switching module at step 180, and it is determined at step 182 whether a first interface module is available. If the first interface module is not available, the method proceeds to step 184.

At step 184, the incoming signaling data is switched to a single stream of incoming signaling data. For example, the switching module may receive a plurality of frames of data from a plurality of data transmission links, where some of the frames of data are incoming signaling data and other frames of data are incoming payload data. The switching module may controllably extract the signaling data frames and store the frames in a buffer circuit, such as a time slot interchange random access memory circuit, at step 186.

At step 188, the frames of incoming signaling data may be received from the buffer circuits in a predetermined order. The method then proceeds to step 190, where the frames of incoming signaling data are transmitted to the second interface module, as the first interface module is unavailable. The method then proceeds to step 192.

If it is determined at step 182 that the first interface module is available, the method proceeds to step 194. At step 194, the incoming signaling data is switched to a single stream of incoming signaling data. For example, the switching module may receive a plurality of frames of data from a plurality of data transmission links, where some of the frames of data are incoming signaling data and other frames of data are incoming payload data. The switching module may controllably extract the signaling data frames and store the frames in a buffer circuit, such as a time slot interchange random access memory circuit, at step 186.

At step 198, the frames of incoming signaling data are received from the buffer circuits in a predetermined order. The method then proceeds to step 200, where the frames of incoming signaling data are transmitted to the first interface module. The method then proceeds to step 192.

At step 192, the incoming signaling data is transmitted from either the first or the second interface module to one or more signaling interface modules. For example, a dedicated set of signaling interface modules may be coupled in series to the first and second interface modules. Alternatively, the first and second interface modules may be coupled to the same signaling interface modules. The method then proceeds to step 202, where the incoming signaling data is transmitted to the call processor from the signaling interface modules.

In operation, method 170 may be used to provide a redundant data path between the data transmission links and the signaling interface modules. In the event of a failure of an interface module, the present invention may be used to ensure that a data path to the signaling interface circuits remains. Method 170 may also be used with redundant sets of signaling interface modules, such that if a signaling interface module fails, then a redundant signaling data path to the call processor remains for out-of-band signaling data.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A system for processing signaling data comprising:

one or more signaling interface modules;

one or more interface modules connected to the signaling interface module(s); and one or more switching modules connected to the interface module(s), the switching module(s) being operable to receive serial signaling data from the interface module (s) in a first sequence, and to output the serial signaling data to the interface module(s) in a second sequence that is provided to the signaling interface modules.

2. The system of claim 1 further comprising:

a signaling resource manager coupled to the signaling interface module(s), the signaling resource manager operable to receive the serial signaling data in the second sequence from the signaling interface module (s) and to transmit serial output signaling data to the signaling interface module(s); and wherein the switching module(s) are operable to receive the serial output signaling data from the signaling interface module(s) and to transmit the serial output signaling data to the interface module(s) in a predetermined order.

3. The system of claim 1 further comprising:

one or more other signaling interface modules;

another interface module having one or more ports, the other interface module coupled to the switching module (s) and the other signaling interface module(s); and wherein the other interface module is operable to transmit the serial signaling data in the second sequence to the other signaling interface module(s).

4. The system of claim 2 further comprising:

another signaling resource manager coupled to the other signaling interface module(s), the other signaling resource manager operable to receive the serial signaling data in the second sequence from the other signaling interface module(s) and to transmit serial output signaling data to the other signaling interface module (s); and wherein the switching module(s) is operable to receive the serial output signaling data from the other signaling interface module(s) and to transmit the serial output signaling data to the other interface module(s).

5. The system of claim 1 wherein the interface module(s) further comprise one or more circuit cards, where each circuit card further includes a predetermined number of ports.

6. The system of claim 3 wherein the other interface module(s) further comprise one or more circuit cards, where each circuit card further includes a predetermined number of ports.

7. The system of claim 3 further comprising one or more other switching modules coupled to the interface module(s) and the other interface module(s), the other switching module(s) operable to receive serial signaling data from the interface module(s) and the other interface module(s) in the first sequence, and to output the serial signaling data to the interface module(s) and the other interface module(s) in the second sequence.

8. The system of claim 1 further comprising:

one or more other signaling interface modules;

one or more other interface modules having one or more ports, where the other interface module(s) further comprises one or more circuit cards, and the interface module(s) further comprise one or more circuit cards, and where each circuit card further comprises a predetermined number of ports;

one or more other switching modules coupled to the other interface module(s), the other switching module(s) operable to receive serial signaling data from the other interface module(s) in the first sequence, and to output the serial signaling data to the other interface module(s) in a second sequence; and wherein the other interface module(s) transmits the serial signaling data in the second sequence to the other signaling interface module(s).

9. A method for processing signaling data comprising:

receiving incoming signaling data from one or more transmission links that includes multiple frames;

switching the multiple frames to form one or more incoming signaling data streams;

processing the incoming signaling data stream(s) to form one or more outgoing signaling data streams based on the destinations associated with the multiple frames; and switching the outgoing data stream(s) for transmission over the transmission link(s).

10. The method of claim 9 further comprising:

receiving selected inband signaling data;

generating outbound signaling data in response to the inband signaling data; and switching the outbound signaling data to one or more outbound data streams.

11. The method of claim 9 wherein receiving incoming signaling data comprises receiving two or more data frames of data, each frame having a predetermined format, where at least one of the frames contains signaling data.

12. The method of claim 9 wherein receiving incoming signaling data comprises receiving embedded SS7 data in a serial E1 data format.

13. The method of claim 9 wherein switching the outgoing data stream(s) comprises transmitting a predetermined number of data frames such that each data frame is associated with a predetermined telecommunications channel.

14. The method of claim 9 wherein switching the outgoing data stream(s) comprises transmitting telecommunications in a serial E1 data format, such that a switching module can switch each E1 telecommunications channel.

15. The method of claim 9 wherein switching the incoming signaling data to form the incoming signaling data stream comprises switching selected data frames from a series of incoming data frames to form the incoming signaling data stream.

16. The method of claim 9 wherein switching the incoming signaling data to form the incoming signaling data stream comprises switching signaling data frames from serial data in an E1 data format to form the incoming signaling data stream.

17. The method of claim 10 wherein receiving selected inband signaling data comprises:

receiving inband signaling from one or more users; and processing the inband signaling data to determined destination signaling data.

18. The method of claim 10 wherein transmitting outbound signaling data comprises transmitting one or more frames of outbound signaling data in predetermined frame locations of an outbound series of data frames.

19. The method of claim 10 wherein switching the outbound signaling data to one or more outbound data streams comprises:

receiving a series of frames of outbound signaling data; and switching the series of frames of outbound signaling data into one or more E1 data formats.

20. A method for processing signaling data comprising:

receiving incoming signaling data that includes multiple frames from one or more telecommunications links;

switching the multiple frames to form one or more incoming signaling data streams;

processing the incoming signaling data stream(s) to form one or more outgoing signaling data streams based on the destinations associated with the multiple frames;

switching the outgoing signaling data stream(s) to one or more signaling interface modules; and switching the outgoing signaling data stream(s) to one or more other signaling interface modules if the signaling interface module(s) becomes unavailable.

21. The method of claim 20 wherein receiving signaling data comprises:

receiving one or more incoming data streams at an interface module, where each incoming data stream comprises one or more payload data frames and one or more signaling data frames;

transmitting the incoming data stream(s) to one or more switching modules in a predetermined format, where each data frame corresponds to a data channel; and receiving the signaling data frame(s) at the switching module(s).

22. The method of claim 20 wherein switching the signaling data to form a single signaling data stream comprises:

storing one or more signaling data frames in one or more corresponding buffer circuits; and transmitting the signaling data frames from the buffer circuits through one or more switching modules in a predetermined order.

23. The method of claim 20 wherein switching the outgoing signaling data stream(s) to the signaling interface module(s) comprises:

transmitting one or more frames of signaling data in a serial E1 data format to an interface module, in which each frame of data contains signaling data;

transmitting the frame(s) of signaling data in a single signaling data stream from the interface module to the signaling interface module(s); and receiving the frame(s) of signaling data at the signaling interface module(s).

24. The method of claim 20 wherein switching the signaling data stream to the other signaling interface module(s) if the signaling interface module(s) become unavailable comprises:

receiving an unavailability message;

transmitting one or more frames of signaling data in a serial E1 data format to an interface module, in which each frame of data contains signaling data;

transmitting the frame(s) of signaling data in a signaling data stream from the interface module to the other signaling interface module(s); and receiving the frame(s) of signaling data at the other signaling interface module(s).

* * * * *